(12) United States Patent
Kissell

(10) Patent No.: US 9,280,896 B2
(45) Date of Patent: Mar. 8, 2016

(54) LAW ENFORCEMENT VEHICLE FORCE MULTIPLIER

(71) Applicant: Douglas Arthur Kissell, Melbourne, FL (US)

(72) Inventor: Douglas Arthur Kissell, Melbourne, FL (US)

(73) Assignee: Douglas Arthur Kissell, Melbourne, FL (US)

( * ) Notice: Subject to any disclaimer, the term of this patent is extended or adjusted under 35 U.S.C. 154(b) by 292 days.

(21) Appl. No.: 13/920,680

(22) Filed: Jun. 18, 2013

(65) Prior Publication Data

US 2013/0335241 A1 Dec. 19, 2013

Related U.S. Application Data

(60) Provisional application No. 61/661,072, filed on Jun. 18, 2012.

(51) Int. Cl.
| | |
|---|---|
| *G08G 1/00* | (2006.01) |
| *G08G 1/017* | (2006.01) |
| *G08G 1/04* | (2006.01) |
| *G08G 1/052* | (2006.01) |
| *G08G 1/07* | (2006.01) |
| *G08G 1/0955* | (2006.01) |
| *H04N 7/18* | (2006.01) |

(52) U.S. Cl.
CPC .............. *G08G 1/0175* (2013.01); *G08G 1/04* (2013.01); *G08G 1/052* (2013.01); *G08G 1/07* (2013.01); *G08G 1/0955* (2013.01); *H04N 7/188* (2013.01)

(58) Field of Classification Search
CPC ....... G08G 1/0175; G08G 1/04; G08G 1/052; G08G 1/07; G08G 1/0955; G08G 7/188
USPC .............. 340/936, 425.5, 937, 539.1, 539.11
See application file for complete search history.

(56) References Cited

U.S. PATENT DOCUMENTS

| | | | |
|---|---|---|---|
| 5,936,550 | A | 8/1999 | McCauley |
| 7,348,881 | B2 | 3/2008 | Watkins |
| 7,365,640 | B2 | 4/2008 | Garcia |
| 2007/0298397 | A1 * | 12/2007 | Thomas ....................... 434/305 |

OTHER PUBLICATIONS

Emch, Eileen, "You Would Slow for *Brad Pitt*—Wooden You?", Russia with Love, http://russiawithlove.blogspot.com/2009/08/you-would-slow-for-brad-pitt-wooden-you.html, Aug. 3, 2009.

(Continued)

*Primary Examiner* — Daryl Pope

(74) *Attorney, Agent, or Firm* — Mark R. Malek; Kelly G. Swartz; Widerman Malek, PL

(57) ABSTRACT

A law enforcement fleet multiplier device including a law enforcement vehicle silhouette may include a plurality of sections connected to one another and connectors to connect each of the plurality of sections to a surface. The device may also include a control module carried by one of the plurality of sections and a light array carried by an upper portion of at least one of the plurality of sections and in communication with the control module. The device may further include a power supply carried by one of the plurality of sections and in communication with the control module and a sensor carried by one of the plurality of sections and in communication with the control module. The light array and the sensor may be remotely operable based on a sensed condition, and/or responsive to user defined conditions.

16 Claims, 8 Drawing Sheets

(56) References Cited

OTHER PUBLICATIONS

"Bearded Genius Created Tric-Vic TO Slow Speeders", retrieved from http://jalopnik.com/372114/bearded-genius-creates-tric+vic-to-slow-speeders, Mar. 25, 2008.

"Police Cruiser and Other Traffic Safety Cutouts:", Document retrieved using internet archive, WayBackMachine (web.archive.org), from web.archive.org/web/20100409095202/http://www.silhouettesrus.com/, having a publication date of Apr. 9, 2010.

"Putnam Ct. copes are real stiffs!", retrieved from http://www.st-owners.com/forums/showthread.php?104327-Putnam-Ct.-cops-are-real-stiffs!, Jul. 4, 2011.

* cited by examiner

LAW ENFORCEMENT VEHICLE FORCE MULTIPLIER

RELATED APPLICATIONS

This application is related to and claims the benefit under 35 U.S.C. §119(e) of U.S. Provisional Patent Application Ser. No. 61/661,072 filed on Jun. 18, 2012 titled *Multi-Angled Double-Sided Law Enforcement Vehicle Force Multiplier and Associated Methods*, the entire contents of which are incorporated herein by reference.

FIELD OF THE INVENTION

The present invention relates to the field of decoy law enforcement vehicles and, more specifically, to the field of multi-angled double-sided law enforcement vehicle force multipliers and associated methods.

BACKGROUND OF THE INVENTION

Law enforcement agencies across the country, and around the world, struggle to provide a sufficient number of officers in law enforcement vehicles to effectively enforce traffic regulations. With a seemingly endless network of roadways and only a limited number of officers and law enforcement vehicles, it simply isn't possible to have a manned law enforcement vehicle monitoring every stretch of road for motorists violating traffic regulations or warning motorists of safety hazards. Even if the number of police officers was not the issue, the capital outlay required to obtain and maintain a fleet of law enforcement vehicles large enough to patrol every road in a given jurisdiction would far exceed the budget of almost every law enforcement agency. Likewise, the expense associated with obtaining and maintaining a fleet of unmanned law enforcement vehicles for placement along roadways as a deterrent or warning to passing motorists is cost prohibitive.

It is commonly known that decoy law enforcement vehicle silhouettes, or cut outs, positioned alongside roadways or in other appropriate settings may be used to simulate the presence of actual law enforcement vehicles. However, the known decoy law enforcement vehicle silhouettes are typically only marginally realistic, are often difficult to transport and set up, and don't provide sufficient cover as a hiding place for an actual law enforcement vehicle. For instance, a traditional decoy law enforcement vehicle silhouette might consist of a plywood, or other solid surface, cut out mounted on a trailer and painted on one side to look like a law enforcement vehicle. The capability of such a traditional decoy law enforcement vehicle silhouette to deter passing motorists from violating traffic regulations is limited by its almost cartoon-like appearance, its unnatural positioning atop a trailer and the unrealistic one-sided appearance. Similarly, the functionality of such a traditional decoy law enforcement vehicle silhouette as a hiding place for an actual law enforcement vehicle might be reduced as a result of its solid surface construction, interfering with the law enforcement officer's ability to monitor passing motorists, and its placement atop a trailer providing imperfect cover. Such a traditional decoy law enforcement vehicle silhouette would also typically require the use of a specialized vehicle for delivery and recovery.

It is also commonly known that traditional decoy law enforcement vehicle silhouettes are only passive deterrents to the violation of traffic regulations. A decoy law enforcement vehicle silhouette may bear the logo and other distinctive markings of an actual law enforcement vehicle. Such marked decoy law enforcement vehicle silhouettes, however, are not capable of reacting to the passing motorist, of notifying passing motorists of dangerous conditions or of providing evidence of the violation of traffic regulations.

There are some decoy law enforcement vehicle silhouettes that have attempted to more accurately simulate the presence of an actual law enforcement vehicle. For example, U.S. Pat. No. 7,348,881 to Watkins discloses a reflective law enforcement vehicle decoy comprising an image of a law enforcement vehicle's reflective areas. The reflective areas include pursuit lights, headlights, decals, numbering area, spot light and license plate. The reflective areas are traced onto a suitable non-reflective surface and are separated into groups. The reflective areas are covered with reflective material in various patterns, consistent to colors associated with a particular law enforcement agency's marking and coloring schemes. The groups of reflective areas are attached to a suitable mounting platform for placement along a roadway to allow passing motorist headlights to illuminate the decoy, thereby creating the illusion of a law enforcement vehicle.

U.S. Pat. No. 7,365,640 to Garcia discloses a transportable police vehicle decoy having a life-like, life-size visual image of a police vehicle mounted onto a trailer for transportability. The image of the police vehicle is disposed on the trailer so that the wheels of the trailer appear to be the wheels of the police vehicle shown in the image. Operational emergency lights are positioned in the proper location on the image of the police vehicle and can be activated by speed detection devices when a speeding vehicle approaches. The speed detection devices are provided with communication means to alert police officers waiting to make traffic stops beyond the visual display. The visual display can be folded into one or more segments for transportation. Batteries are provided for electrical power and a solar panel is provided to recharge the batteries or provide direct power to the working components.

U.S. Pat. No. 5,936,550 to McCauley discloses a surveillance apparatus and method for the surveillance of traffic. The apparatus includes a housing for substantially completely enclosing and concealing a law enforcement vehicle therein. The housing includes an entrance door, an exit door, side walls, a ceiling and a floor. A one-way window extending around part or nearly all of the housing is provided such that a vehicle operator in a vehicle inside the housing may visually monitor traffic. The one-way window prevents vehicles in traffic from visually determining whether a vehicle is present in the apparatus. The apparatus is transportable in the manner of a trailer, such that it may be towed to a desired location. Entrance ramps and exit ramps are provided.

A decoy law enforcement vehicle silhouette is disclosed at the website http://russiawithlove.blogspot.com/2009/08/you-would-slow-for-brad-pitt-wooden-you.html. A two dimensional stylized depiction of a law enforcement vehicle, in perspective view, is disclosed. The two dimensional image is displayed between two pairs of opposing inclined supports. Another decoy law enforcement vehicle silhouette is disclosed at the website http://www.silhouettesrus.com/. A two dimensional stylized depiction of the front half of a law enforcement vehicle, in side view, is disclosed. The two dimensional image is printed on vinyl and affixed to a plywood backing. An image of the inventor's head is depicted in the front window of the decoy law enforcement vehicle silhouette.

Yet another decoy law enforcement vehicle silhouette is disclosed at the website http://www.st-owners.com/forums/showthread.php?104327-Putman-Ct.-cops-are-real-stiffs!. In a post dated Jul. 4, 2011 on the website, a two dimensional stylized depiction of a Polish law enforcement officer standing next to a Polish law enforcement vehicle, in side view, is disclosed. The two dimensional image is displayed on two vertical supports. On the same website, and on the website http://jalopnik.com/372114/bearded-genius-creates-tric+ vic-to-slow-speeders, still another decoy law enforcement vehicle is disclosed. A two dimensional stylized depiction of a law enforcement vehicle, in rear view, is disclosed. The two dimensional image, dubbed the "Tric-Vic", is constructed of expanded metal and reflectors arranged in such a way as to mimic the rear end of a Ford® Police Interceptor.

There exists a need to provide a decoy law enforcement vehicle silhouette that is realistic, easy to transport and set up, and that provides sufficient cover as a hiding place for an actual law enforcement vehicle while at the same time permitting the monitoring of passing traffic. There is also a need to provide a decoy law enforcement vehicle silhouette capable of reacting to the passing motorist, of notifying passing motorists of dangerous conditions and of providing evidence of the violation of traffic regulations. Furthermore, there is a need for an associated computer program product.

SUMMARY OF THE INVENTION

With the above in mind, the present invention is directed to a multi-angled double-sided law enforcement vehicle force multiplier with an associated computer program. The computer program may include a user interface that permits a user to access a traffic monitoring system for input of data relating to safety hazards and traffic regulations, and a database to store the data. The traffic monitoring system may include an interface to permit a user to edit the safety hazard and traffic regulation data for storage on the database. The interface may, alternatively or in combination, permit a user to record or otherwise document violations of traffic regulations for storage on the database. The traffic monitoring system may include an interface to permit a user to print a record of a violation of a traffic regulation. The interface may also, alternatively or in combination, permit a user to selectively activate a warning signal in a desired area to advise motorists of safety hazards.

These and other objects, features and advantages according to the present invention are provided by a law enforcement fleet multiplier device including a law enforcement vehicle silhouette. The device may include a plurality of sections connected to one another. Each of the plurality of sections may have an obverse surface and a reverse surface. The device may also include connectors to connect each of the plurality of sections to a surface, and a control module carried by one of the plurality of sections. The device may still further include a light array carried by an upper portion of at least one of the plurality of sections and in communication with the control module. The device may also include a power supply carried by one of the plurality of sections and in communication with the control module, and a sensor carried by one of the plurality of sections and in communication with the control module. The light array and the sensor may be remotely operable. Further, the light array may be operable responsive to the sensor based on a sensed condition, and either or both of the light array and the sensor may be operable responsive to user defined conditions.

The obverse surface may a substrate having markings of a law enforcement vehicle positioned thereon and, in some embodiments, the reverse surface may carry a substrate having markings of a law enforcement vehicle positioned thereon. The sensor may be provided by a camera and a speed detection device and the light array may be operable responsive to detection of a parameter by one or both of the camera or the speed detection device. The parameter may be at least one of an observed speed, an observed vehicle operation, an observed visibility condition, an observed vehicle accident, an observed maintenance condition, or an observed hazard condition. Alternately, the parameter may be at least one of a reported vehicle speed, a reported vehicle operation, a reported visibility condition, a reported vehicle accident, a reported maintenance condition, or a reported hazard condition.

The power supply may be provided by a battery, and the battery may, in some instances be connected to a solar powered trickle charger. The sensor may include a tamper sensor, and the camera may be operable responsive to the tamper sensor. Images captured by the camera may be transmitted to a remote location. The plurality of sections may include a front section, a middle section and a rear section that are connectable to one another using a hinged connection, a latch and catch connector, or a hook and eye connector. The camera may capture an image of at least a portion of a vehicle responsive to a speed detected by the speed detection device in excess of a parameter. The at least one image may be defined as a captured image, and the camera may transmit the captured image to a remote location for issuance of a citation.

The present invention also includes a law enforcement fleet multiplier system that comprises a plurality of law enforcement fleet multiplier devices. Each of the plurality of law enforcement fleet multiplier devices may be communicatively connected to one another and to a central location.

DETAILED DESCRIPTION OF THE PREFERRED EMBODIMENT

Figure 1:
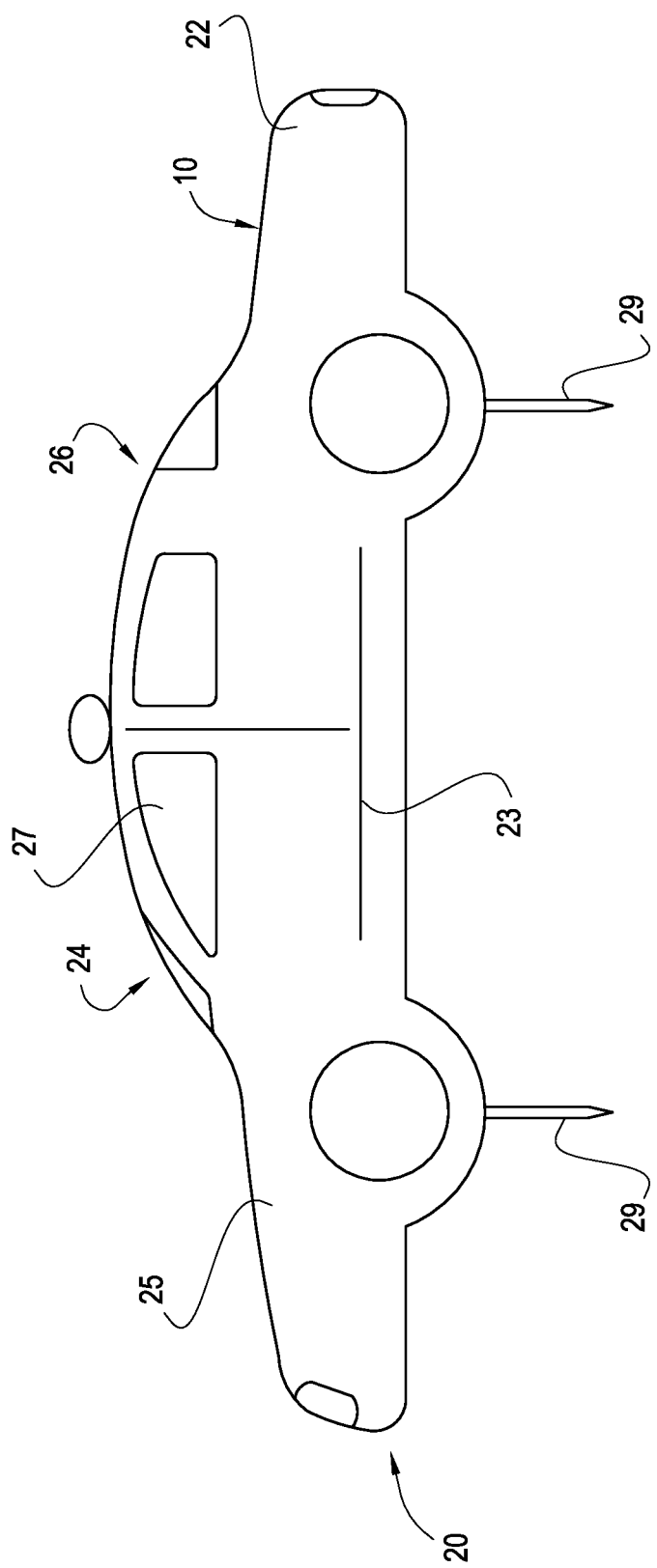
FIG. 1 is a perspective view of a multi-angled double-sided law enforcement vehicle force multiplier with an associated computer program according to an embodiment of the present invention.

The present invention will now be described fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art will realize that the following embodiments of the present invention are only illustrative and are not intended to be limiting in any way. Other embodiments of the present invention will readily suggest themselves to such skilled persons having the benefit of this disclosure.

Throughout this disclosure, the present invention may be referred to as a computer program product, a computer program, a product, a system, a tool, and a method. Those skilled in the art will appreciate that this terminology does not affect the scope of the invention as outlined in the claims appended herewith. Likewise, throughout this disclosure, the present invention may be referred to as relating to a law enforcement vehicle force multiplier, a law enforcement vehicle decoy, a law enforcement vehicle cut out, a law enforcement vehicle silhouette, a force multiplier, a decoy, a cut out, a silhouette, a system or a device. Those skilled in the art will appreciate that this terminology is only illustrative and does not affect the scope of the invention as outlined in the claims appended herewith. For instance, the present invention may just as easily relate to department of transportation vehicle silhouettes, municipal road maintenance vehicle cut outs, decoy private security vehicles or force multipliers for other vehicles that are used in the regulation of traffic or the notification of hazards on public or private roadways.

A multi-angled double-sided law enforcement vehicle force multiplier with an associated computer program 10 according to the present invention can advantageously simulate the presence of an actual law enforcement vehicle, with the ability to react to a passing motorist, when activated by a remote operator or by following parameters programmed into the associated computer program. More specifically, the multi-angled double-sided law enforcement vehicle force multiplier with an associated computer program 10 according to the present invention may advantageously provide a high definition image of a law enforcement vehicle, on both sides of a silhouette substrate, with a remotely operable light bar or light array, thereby realistically simulating the presence of an actual manned law enforcement vehicle, at a significant savings over the cost of a obtaining and maintaining a law enforcement vehicle and paying the salary and benefits of a uniformed law enforcement officer. This is accomplished by providing a multi-angled double-sided law enforcement vehicle force multiplier with an associated computer program 10 permitting access to, modification of and storage of traffic monitoring information.

Referring now to FIGS. 1-4, general details of the multi-angled double-sided law enforcement vehicle force multiplier with an associated computer program 10 according to the present invention are now described. As will be discussed in greater detail below, the unique design of the multi-angled double-sided law enforcement vehicle force multiplier with an associated computer program 10 includes a silhouette 20, a light array 30, a controller module 40 and an associated computer program 50.

Individual portions of the multi-angled double-sided law enforcement vehicle force multiplier with an associated computer program 10 according to the present invention will now be discussed in greater detail. As depicted in FIG. 1, the silhouette 20, according to a preferred embodiment of the present invention, may be provided by a substrate 22 and may include on an obverse surface 23 thereof a simulated vehicle image 25. The substrate 22 may include on a reverse surface 24 thereof a mirror image of a simulated vehicle 26. The substrate 22 may be provided by any durable and sturdy material such as rolled aluminum, high grade resin sign board, or plywood. The silhouette 20, according to a preferred embodiment of the present invention, may include a connector 29 which may, for example, be provided by at least one stake 29 affixed to the silhouette and extending downwardly therefrom. Those skilled in the art will appreciate that while a single substrate 22 is depicted in FIG. 1, the present invention also contemplates a pair of substrates 22 positioned on opposing sides of the at least one stake 29 so as to sandwich the stake between the pair of substrates 22. In such an embodiment according to the present invention, the simulated vehicle image 25 may be provided on the obverse surface 23 of a first substrate 22 and the mirror image of a simulated vehicle 26 may be provided on the reverse surface 24 of a second substrate 22. The stake 29 may be positioned between the reverse surface 24 of the first substrate 22 and the obverse surface 23 of the second substrate 22. Those skilled in the art will appreciate that while the stake 29 may be provided by anything suitable for insertion into the ground, the present invention also contemplates the use of a stand so that the present invention may be deployed on hard surfaces.

The substrate 22, vehicle image 25 and mirror image of a simulated vehicle 26, may be larger than actual size. In a preferred embodiment of the multi-angled double-sided law enforcement vehicle force multiplier with an associated computer program 10 according to the present invention, the substrate 22, simulated vehicle image 25 and mirror image of a simulated vehicle 26 may be fifteen percent (15%) larger than actual size. The larger than actual size substrate 22, simulated vehicle image 25, and mirror image of a simulated vehicle 26 may provide greater visibility of the present invention to passing motorists and may provide better coverage for an actual law enforcement vehicle positioned behind the present invention. The substrate 22, according to a preferred embodiment of the present invention, may include therein a visibility portal 27 positioned substantially concurrent with a front window of a simulated vehicle depicted in the simulated vehicle image 25 and the mirror image of a simulated vehicle 26. While the visibility portal 27 is depicted in FIG. 1 as a cut out, the visibility portal may be provided by a transparent panel, a perforated panel, a mesh panel, or other suitable viewing opening.

Figure 2:
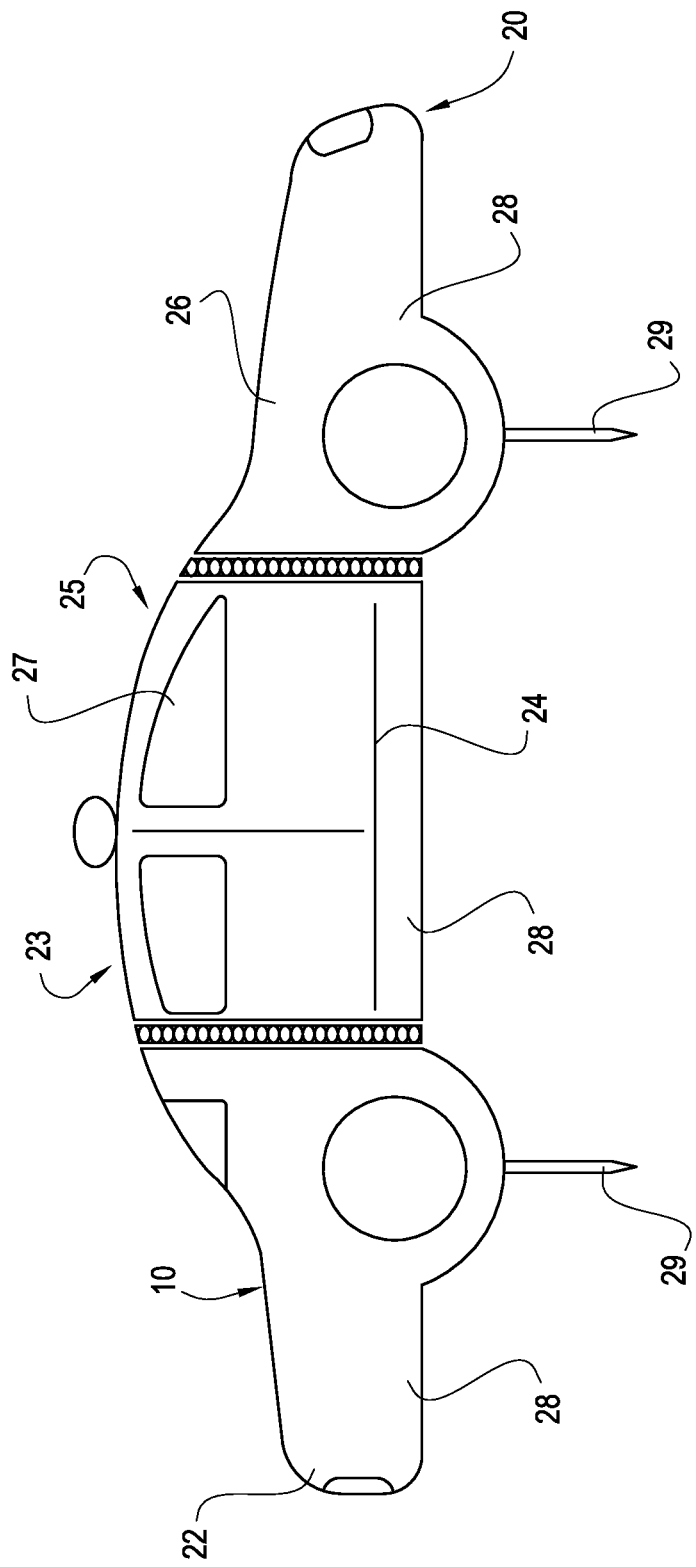
FIG. 2 is a perspective view of a multi-angled double-sided law enforcement vehicle force multiplier with an associated computer program according to another embodiment of the present invention.

As depicted in FIG. 2, the silhouette 20, according to a preferred embodiment of the present invention, may include a substrate 22 divided into sections 28 sized to permit easy transportation of the substrate. While the sections 28 depicted in FIG. 2 are depicted as being hingedly connected to each other by a piano hinge, the sections could also be connected by latch and catch, hook and eye or other suitable closure. Likewise, while the hinged connections between sections 28 are depicted in FIG. 2 as appearing on the reverse surface 24 of the substrate 22, the hinged connections could also be provided on the obverse surface 23 of the substrate, or on a combination of the reverse surface and the obverse surface. Although not shown, the present invention contemplates use of a stake 29 on each section 28 to enhance stability.

Figure 3:
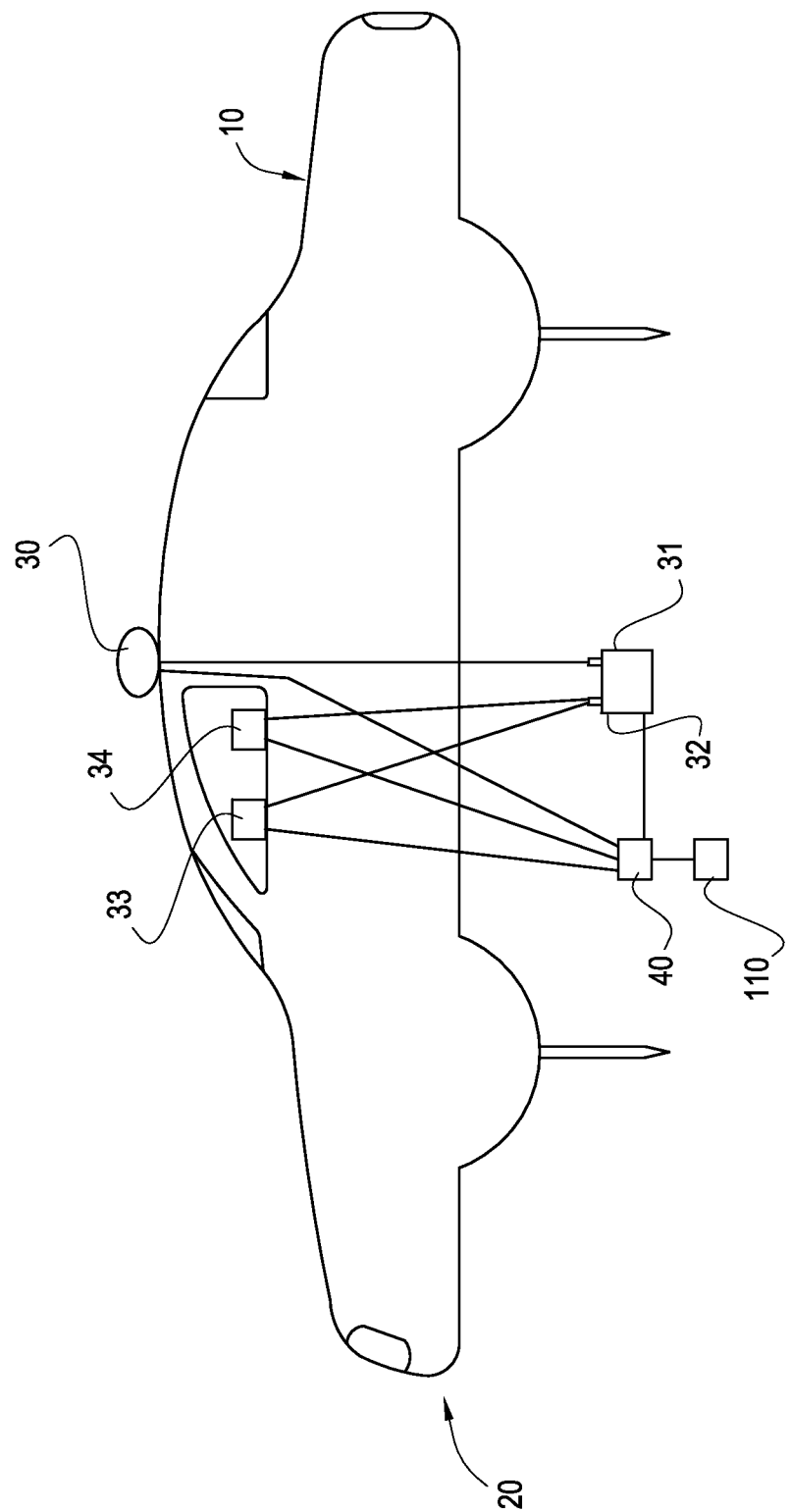
FIG. 3 is a perspective view of a multi-angled double-sided law enforcement vehicle force multiplier with an associated computer program illustrating a light array, a camera, a speed detection device and a power supply according to yet another embodiment of the present invention.

As depicted in FIG. 3, the silhouette 20 may include a light array 30 attached thereto. The light array may include lights of any color, or any combination of colors, so as to simulate the flashing lights of a law enforcement vehicle. The light array 30, according to a preferred embodiment of the present invention, may include a combination of blue lights, white lights, red lights and yellow lights. The light array 30 may include a power supply 31. The power supply 31 may be provided by a battery 32. While the power supply 31 is depicted as a battery 32 in FIG. 3, the power supply may also be provided by a solar panel, a battery with a solar panel trickle charger, a direct connection to alternating current, a direct connection to alternating current with a battery backup, or other suitable power supply. The silhouette 20 may include at least one camera 33 and a speed detection device 34 connected to the power supply 31. The camera 33 may capture still images or video. The camera 33 may be moveable. Those skilled in the art will appreciate that the camera 33 may be mounted on a servo to achieve motion, may be mechanically moveable, or may use any other suitable means to permit 360 degree visibility.

Although not shown, the silhouette 20 may include a tamper sensor to detect an attempt to tamper with the light array 30, the power supply 31, the battery 32, the camera 33 the speed detection device 34, or any part of the silhouette. More particularly, the camera 33 may be operable responsive to the tamper sensor. For example, upon the tamper sensor detecting an attempt to tamper with the silhouette, the control module 40 may cause the camera 33 to operate. In embodiments of the invention where the camera 33 is movable, the camera may rotate to capture an image of the environment surrounding the silhouette 20. Images captured by the camera 33 may be transmitted to a remote location. These images may be used by law enforcement in an attempt to apprehend those who may have tampered with the silhouette 20. Further, the mobile camera 33 may simply be used by law enforcement to observe various areas. For example, in addition to enforcing traffic regulations, the silhouettes 20 according to embodiments of the present invention may be used to observe various areas in an attempt to detect, or reduce, criminal activity in those areas.

A controller module 40 may be communicatively connected to the light array 30, the camera 33, the speed detection device 34 and the power supply 31. The controller module 40 may permit the selective remote operation of the light array 30, the camera 33 and the speed detection device 34. The controller module 40 may also permit the operation of the light array 30, the camera 33, and the speed detection device 34 pursuant to parameters programmed into a computer program 50. The parameters may include dates, times, observed speed, reported speed, observed vehicle operation, reported vehicle operation, observed visibility conditions, reported visibility conditions, observed accidents, reported accidents, observed maintenance conditions, reported maintenance conditions, observed hazard conditions, reported hazard conditions and any other suitable criteria.

More specifically, responsive to, for example, an observed speed (or a sensed speed) sensed by the speed detection device 34 (a sensor), the control module 40 may operate the light array 30. Therefore, as a vehicle approaches the silhouette 20 and the speed detection device 34 senses that the vehicle is traveling at a rate of speed that is above a parameter, or below a threshold parameter, then the control module 40 may operate the light array 30. This will preferably cause the operator of the vehicle exceeding the speed parameter to slow down or cause the operator of the vehicle not meeting the threshold speed parameter to speed up. The present invention contemplates, as will be discussed in greater detail below, that the control module 40 may also cause the camera 33 to photograph the vehicle traveling at a rate of speed that exceeds the parameter or that does not at least meet the threshold parameter so as to issue a citation.

The camera 33 may be used as the sensor so that certain conditions and parameters may be remotely observed. For example, it is contemplated that an array of silhouettes 20 may be deployed, and the cameras 33 associated with each of the silhouettes in the array of silhouettes may be remotely monitored. This advantageously allows a greater coverage area to be monitored using less manpower. Also for example, images captured by the cameras 33 of each of the silhouettes 20 in the array of silhouettes may be used to set parameters to cause the control module 40 to operate the light array 30. For example, if fog, or other hazardous driving conditions are observed using the camera 33 remotely, then an operator may send an instruction for the control module 40 to operate the light array 30. This advantageously can provide motorists, or operators of the vehicles, with some warning of the hazardous driving conditions.

Those skilled in the art will appreciate that the light array 30 of the silhouette 20 according to an embodiment of the present invention may include, as some portion thereof, a light sign that provides information to passing motorists. For example, if a hazard, such as a vehicle accident, is observed or reported, the light sign may provide a warning to motorists. For example, the light sign may indicate a warning message such as "Warning—Accident Ahead" or "Warning—Fog Ahead" or any other type of warning that may be used to warn motorists of hazardous conditions.

The light sign may also be used to warn motorists depending on a specific time of the year. For example, when school resumes, motorists generally need to be reminded to slow down next to school zones, or other areas where young students may be crossing the street. The light sign may be activated to provide such a warning, or an operator may cause the control module 40 to activate the light array 30 to provide a warning to motorists. Similarly, the light array 30 or light sign may be operated by the control module 40 in construction zones, or during any time where motorists should use extra caution. The silhouette 20 according to an embodiment of the present invention advantageously decreases manpower necessary to provide law enforcement personnel at construction sites in an effort to slow motorists down in construction zones.

As indicated above, the silhouette 20 according to an embodiment of the present invention may be remotely operated. This may also occur based on reported findings. For example, a motorist may come upon a vehicle accident or a hazardous driving condition and call in such an accident or condition to law enforcement. Since it may take some amount of time to respond to the accident or hazardous driving condition, the light array 30 of a deployed silhouette 20 may be remotely operated to slow motorists down, or to warn motorists, prior to law enforcement personnel arriving on scene.

Figure 4:
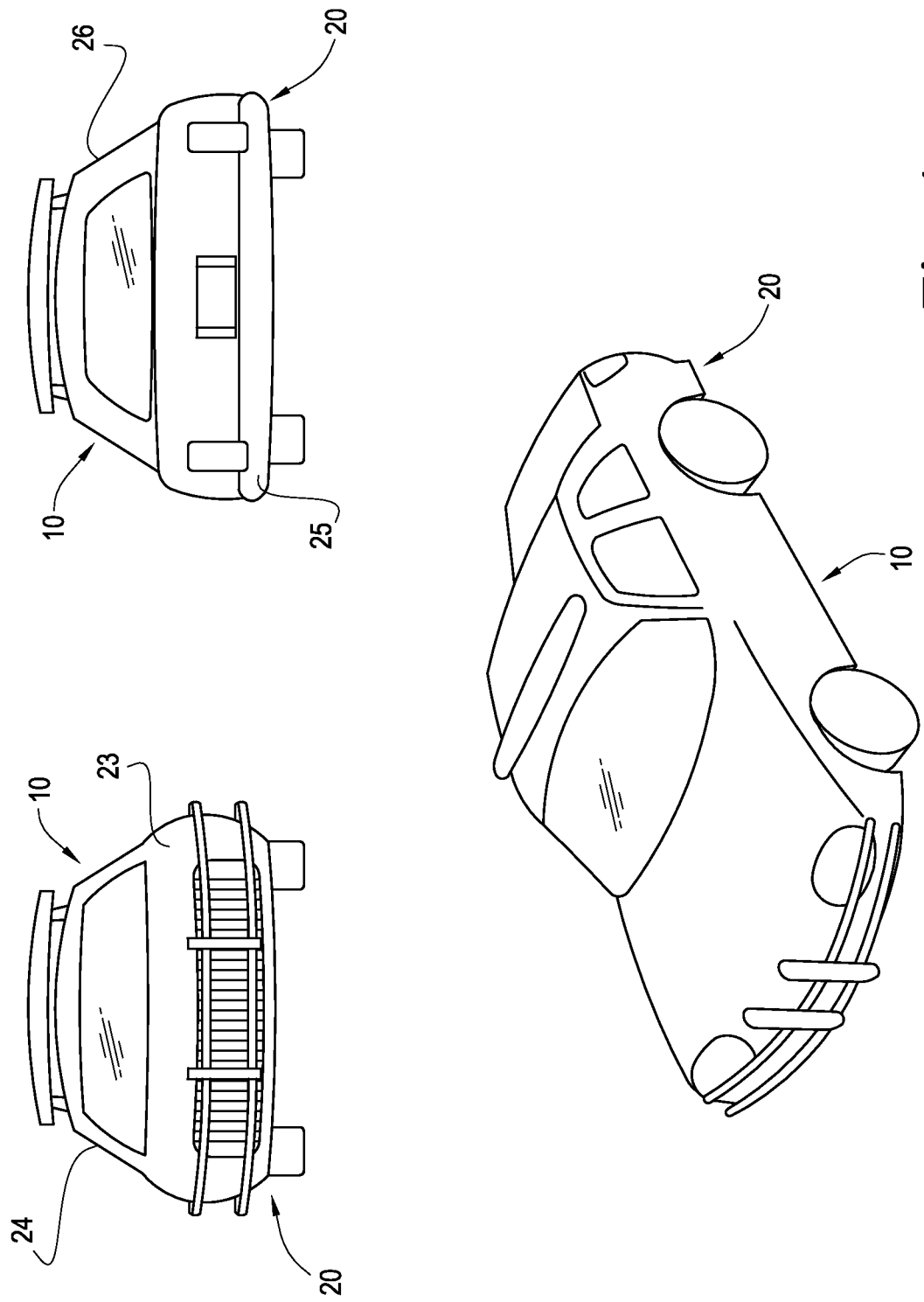
FIG. 4 illustrates multiple views of a multi-angled double-sided law enforcement vehicle force multiplier with an associated computer program according to still another embodiment of the present invention.

While the silhouette 20 is depicted in FIGS. 1-3 as a side view of a simulated vehicle, the present invention also contemplates the silhouette 20 being provided as a front view of a simulated vehicle, and as a perspective view of a simulated vehicle. As perhaps best illustrated in FIG. 4, those skilled in the art will appreciate that the silhouette 20, when provided as a front view, may include a substrate 22 having on an obverse surface 23 thereof a front view of a simulated vehicle 25 and a reverse image of a simulated vehicle 26 on a reverse surface 24 thereof. Likewise, those skilled in the art will appreciate that the silhouette 20, when provided as a perspective view, may include a substrate 22 having on an obverse surface 23 thereof a perspective view of a simulated vehicle 25 and a mirror image of a simulated vehicle 26 on a reverse surface thereof, as depicted in FIG. 4.

Additionally, while the silhouette 20, substrate 22, simulated vehicle image 25 and mirror image of a simulated vehicle 26 are depicted in FIGS. 1-3 as simulating a Ford® Crown Victoria, those skilled in the art will appreciate that the present invention contemplates the incorporation of an image of a simulated vehicle appropriate to a jurisdiction where the present invention is deployed. Therefore, as an example not meant to limit the disclosure herein, if a particular jurisdiction where the present invention is to be deployed uses a Dodge®

Charger as a law enforcement vehicle, the present invention contemplates the silhouette 20 and substrate 22 taking the shape of the Dodge Charger, and contemplates the simulated vehicle image 25 and mirror image of a simulated vehicle 26 taking the appearance of the Dodge Charger. Similarly, while the simulated vehicle image 25 and mirror image of a simulated vehicle 26 are depicted in FIGS. 1-3 as bearing the markings of a Brevard County, Florida Sheriff's Office patrol vehicle, the present invention contemplates the simulated vehicle image 25 and mirror image of a simulated vehicle 26 bearing the markings of a law enforcement vehicle native to the jurisdiction where the present invention is to be deployed.

Figure 5:
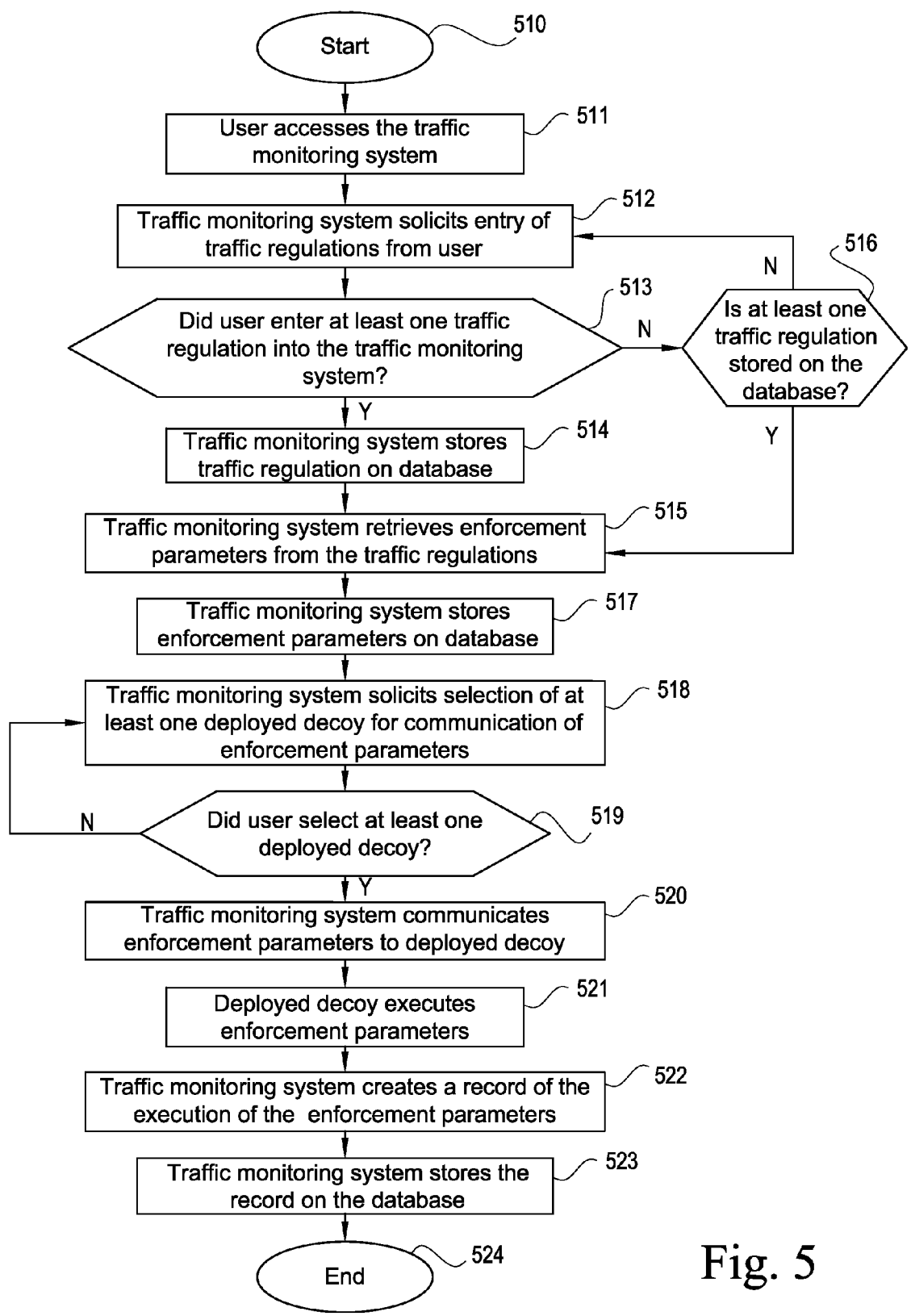
FIGS. 5-7 are flowcharts illustrating method aspects of the present invention directed to operating a computer program according to an embodiment of the present invention.
Figure 6:
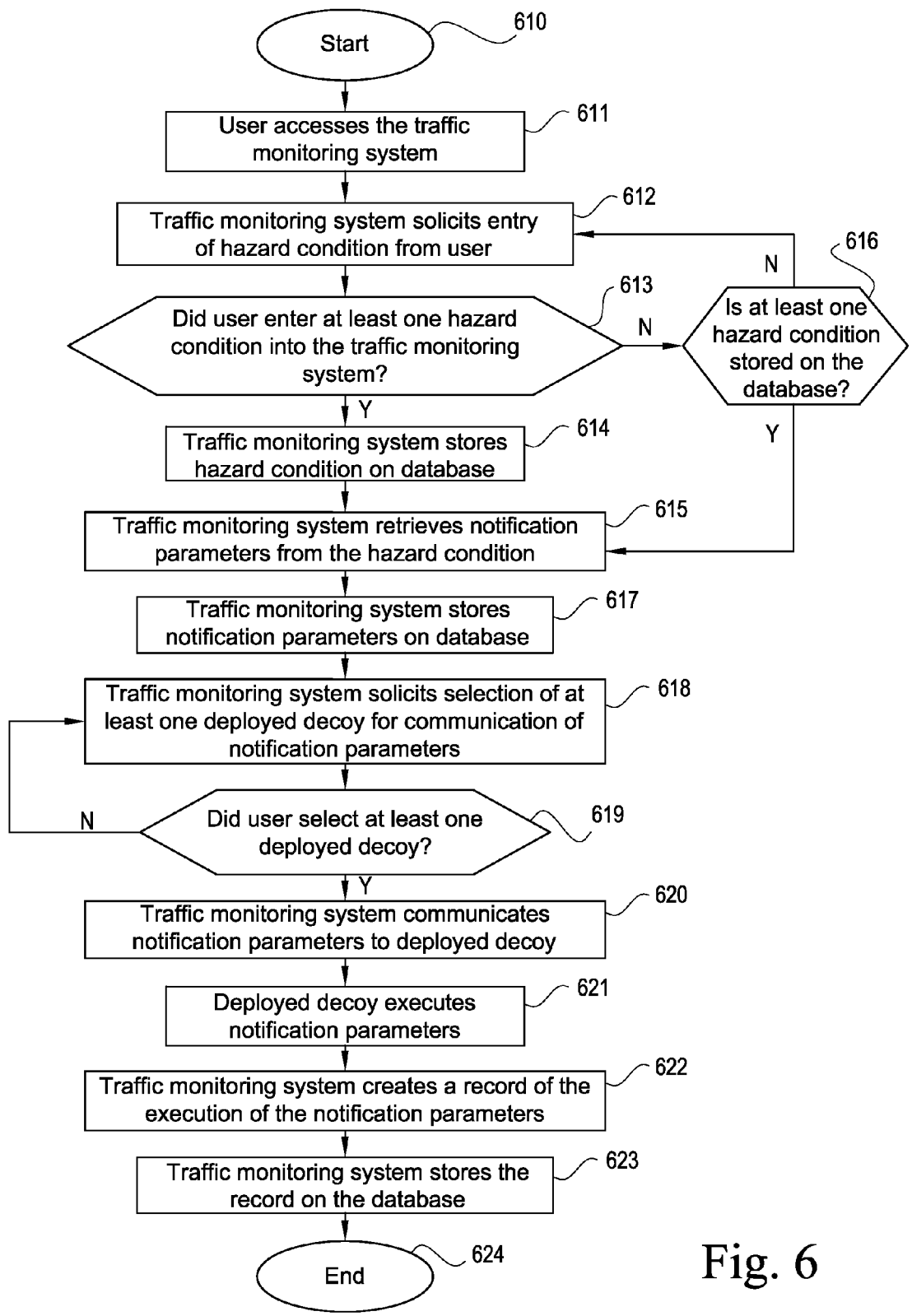
Figure 7:
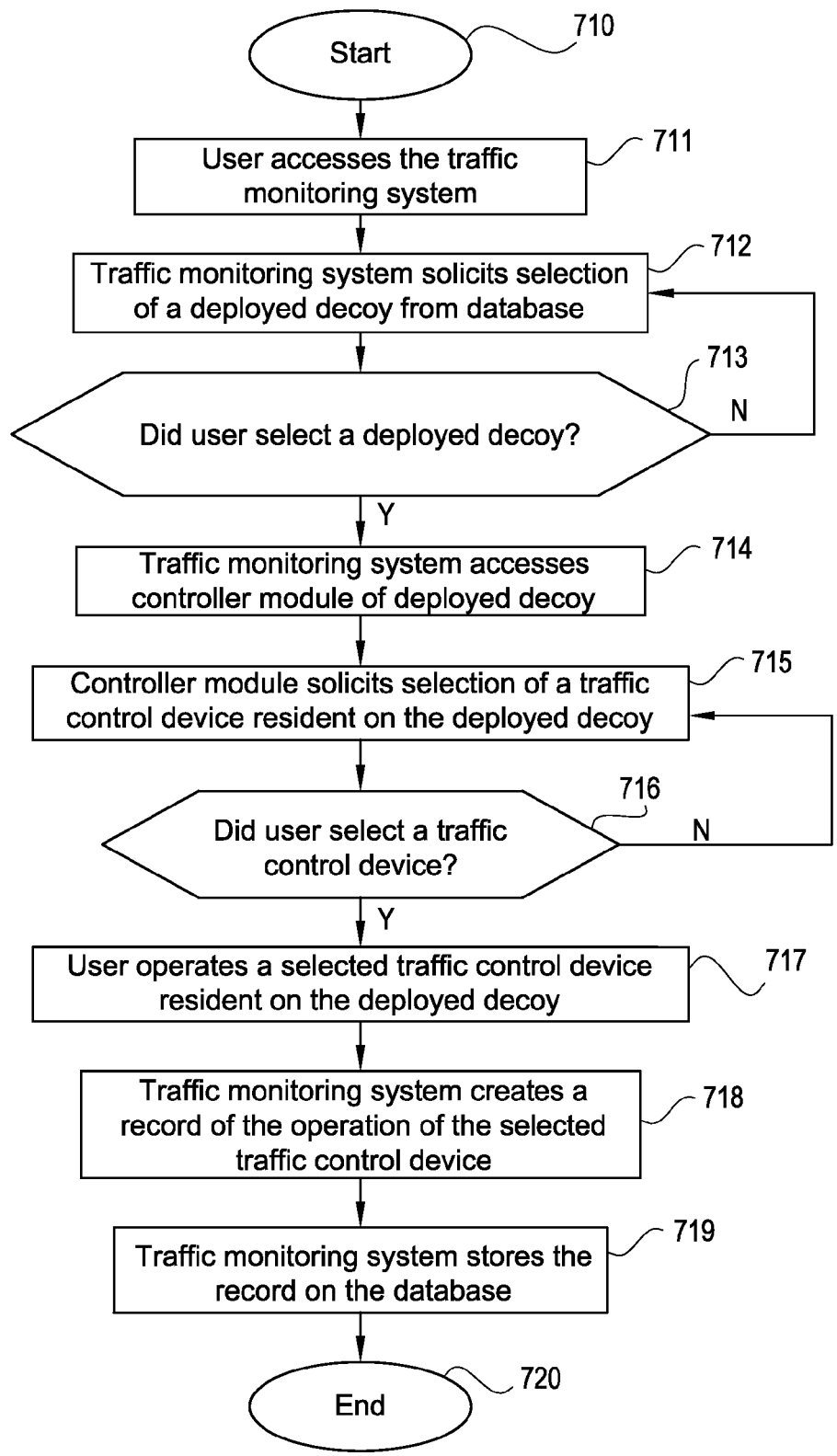

Referring now to FIGS. 5-7, general details of the associated computer program 50 according to embodiments of the present invention are now described. FIG. 5 provides a basic overview of a method aspect according to an embodiment of the present invention directed to a user entering data into the traffic monitoring system. From the start (Block 510) the user may access the traffic monitoring system at Block 511. The traffic monitoring system may prompt the user for entry of at least one traffic regulation at Block 512. At Block 513 it may be determined whether the user entered at least one traffic regulation to the traffic monitoring system. If it is determined at Block 513 that the user did enter at least one traffic regulation to the traffic monitoring system, the traffic monitoring system may store the traffic regulation to the database at Block 514 and then the traffic monitoring system may retrieve enforcement parameters from the traffic regulation at Block 515. If it is determined at Block 513 that the user did not enter at least one traffic regulation to the traffic monitoring system, it may be determined at Block 516 whether at least one traffic regulation is stored in the database. If it is determined at Block 516 that at least one traffic regulation is stored in the database, the traffic monitoring system may retrieve enforcement parameters from the traffic regulation at Block 515. If, however, it is determined at Block 516 that no traffic regulation is stored in the database, the traffic monitoring system may again prompt the user for entry of at least one traffic regulation at Block 512. The traffic monitoring system may store the enforcement parameters to the database at Block 517. The traffic monitoring system may solicit selection of at least one deployed decoy for communication of the enforcement parameters at Block 518. If it is determined at Block 519 that the user selected at least one deployed decoy, the traffic monitoring system may communicate the enforcement parameters to the selected deployed decoys at Block 520. If, however, it is determined at Block 519 that the user did not select at least one deployed decoy, the traffic monitoring system may again prompt the user for selection of at least one deployed decoy at Block 518. The deployed decoy may execute the enforcement parameters at Block 521 and the traffic monitoring system may create a record of the execution of the enforcement parameters at Block 522. The traffic monitoring system may store the record of the execution of the enforcement parameters at Block 523. Thereafter the method is ended at Block 524.

FIG. 6 provides a basic overview of another method aspect according to an embodiment of the present invention directed to a user entering data into the traffic monitoring system. From the start (Block 610) the user may access the traffic monitoring system at Block 611. The traffic monitoring system may prompt the user for entry of at least one hazard condition at Block 612. At Block 613 it may be determined whether the user entered at least one hazard condition to the traffic monitoring system. If it is determined at Block 613 that the user did enter at least one hazard condition to the traffic monitoring system, the traffic monitoring system may store the hazard condition to the database at Block 614 and then the traffic monitoring system may retrieve notification parameters from the hazard condition at Block 615. If it is determined at Block 613 that the user did not enter at least one hazard condition to the traffic monitoring system, it may be determined at Block 616 whether at least one hazard condition is stored in the database. If it is determined at Block 616 that at least one hazard condition is stored in the database, the traffic monitoring system may retrieve notification parameters from the hazard condition at Block 615. If, however, it is determined at Block 616 that no hazard condition is stored in the database, the traffic monitoring system may again prompt the user for entry of at least one hazard condition at Block 612. The traffic monitoring system may store the notification parameters to the database at Block 617. The traffic monitoring system may solicit selection of at least one deployed decoy for communication of the notification parameters at Block 618. If it is determined at Block 619 that the user selected at least one deployed decoy, the traffic monitoring system may communicate the notification parameters to the selected deployed decoys at Block 620. If, however, it is determined at Block 619 that the user did not select at least one deployed decoy, the traffic monitoring system may again prompt the user for selection of at least one deployed decoy at Block 618. The deployed decoy may execute the notification parameters at Block 621 and the traffic monitoring system may create a record of the execution of the notification parameters at Block 622. The traffic monitoring system may store the record of the execution of the notification parameters at Block 623. Thereafter the method is ended at Block 624.

FIG. 7 provides a basic overview of still another method aspect according to an embodiment of the present invention directed to a user remotely controlling traffic control devices resident on a deployed decoy. From the start (Block 710) the user may access the traffic monitoring system at Block 711. The traffic monitoring system may prompt the user for selection of at least one deployed decoy from the database at Block 712. At Block 713 it may be determined whether the user selected at least one deployed decoy. If it is determined at Block 713 that the user did select at least deployed decoy, the traffic monitoring system may access the controller module of the selected deployed decoys at Block 714 and the traffic monitoring system may prompt the user to select at least one traffic control device resident on the deployed decoy over which to exercise control at Block 715. If, however, it is determined at Block 713 that the user did not select at least one deployed decoy, the traffic monitoring system may again prompt the user to select at least one deployed decoy at Block 712. If it is determined at Block 716 that the user did not select at least one traffic control device resident on the deployed decoy over which to exercise control, the traffic monitoring system may again prompt the user to select at least one traffic control device resident on the deployed decoy over which to exercise control at Block 715. If, however, it is determined at Block 716 that the user did select at least one traffic control device resident on the deployed decoy over which to exercise control, the traffic monitoring system may permit the user to control the selected traffic control devices resident on the deployed decoy at Block 717. The traffic monitoring system may create a record of the operation of the selected traffic control devices resident on the deployed decoy at Block 718 and the traffic monitoring system may store the record on the database at Block 719. Thereafter the method is ended at Block 720.

Those skilled in the art will appreciate that although the methods described above indicate that the user may initially enter traffic regulations or hazard conditions prior to retrieving enforcement parameters or notification parameters, the present invention specifically contemplates that entry of such data is not required in order to carry out the various objects, features and advantages according to the present invention. Instead, the various embodiments of the present invention contemplate that upon accessing the traffic monitoring system, the user may be prompted to link to an existing database of traffic regulations, an existing database of hazard conditions or other external source of data. Upon linking to such information sources, the present invention advantageously may automatically upload, and store to the database, traffic regulations or hazard conditions and may automatically retrieve, and store to the database, enforcement parameters and notification parameters for communication to the deployed decoys. The user may then be presented with the ability to selectively communicate relevant information to deployed decoys.

The present invention also contemplates a method of enforcing traffic regulations associated with generating a traffic citation for an observed violation of traffic regulations and delivering the traffic citation to a motorist. More specifically, upon communicating enforcement parameters to the deployed decoy, the traffic monitoring system may observe a violation of a traffic regulation by use of the camera 33 and/or the speed detection device 34 in the execution of the enforcement parameters. Likewise, a user remotely controlling the camera 33 and/or the speed detection device 34 may observe a violation of a traffic regulation while controlling a traffic device resident on a deployed decoy. Accordingly, after the traffic monitoring system creates a record of the traffic violation, relevant identification information may be retrieved relative to the motorist violating the traffic regulation and a traffic citation may be generated and delivered to the motorist.

In some embodiments, it is contemplated that the sensor, i.e., the camera 33 and the speed detection device 34, may operate based on sensing a vehicle traveling in excess of a parameter. The parameter may be a user defined parameter, i.e., a speed limit, or may be remotely defined based on posted speed limits. Further, it is contemplated that the parameter may be readily changed based on a number of factors. For example, it is contemplated that, if the silhouette 20 is positioned in a school zone, then between certain times of the day, i.e., during school hours, or during hours when students are present, the parameter may be automatically lowered to a school zone speed limit. After such a time has passed, the parameter may be automatically moved to the regular speed limit. It is also contemplated that the parameter may be automatically change during construction zone hours, or any other times when a speed limit may be desired to be changed by authorities. Should a vehicle be detected traveling in excess of the speed limit defined by the parameter, then an image may be captured of at least some portion of the vehicle by the camera 33. In such a case, the image captured by the camera 33 may be defined as a captured image. The captured image may be transmitted, along with data indicating the speed of travel of the vehicle in excess of the parameter. Upon receiving such data and the captured image (which presumably provide identifying information of the vehicle), a citation may be issued. This advantageously eliminates the need for human intervention to enforce various laws. The identifying information may, for example, include an image of the license plate of the vehicle and, depending on the type of camera 33 that is used, potentially the vehicle identification number of the vehicle. Additionally, depending on the type of camera 33 that is used, an image of the operator of the vehicle may be captured.

In other embodiments of the present invention, a law-enforcement force multiplier system may be provided that includes a plurality of law-enforcement fleet multiplier devices 10. In such a case, each of the plurality of law-enforcement fleet multiplier devices 10 may include a law-enforcement vehicle silhouette 20 as described above. Each of the plurality of law enforcement fleet multiplier devices 10 in the law-enforcement fleet multiplier system may be communicatively connected to one another, and to a remote location. This may advantageously provide a law-enforcement fleet multiplier system mesh. More particularly, providing communication between each of the law enforcement fleet multiplier devices 10 in the system may advantageously provide the ability of law enforcement to track a vehicle traveling along a route that includes a plurality of silhouettes 20 positioned thereon. This tracking information can be remotely observed by an operator from a central location that data is being transmitted to, for example. Further, data may be automatically transmitted to a central location so that images captured from the camera 33 associated with each of the silhouettes 20 of the law enforcement fleet multiplier device 10 may be concatenated to form a continuous image depicting travel of a vehicle that is desired to be tracked.

Those skilled in the art will appreciate that each of the silhouettes 20 of the law enforcement fleet multiplier device 10 according to embodiments of the present invention may include GPS data acquisition capabilities. This advantageously allows for location information of each of the silhouettes 20 to be transmitted to a central location for monitoring. This also advantageously may be used when the plurality of silhouettes 20 of the law enforcement fleet multiplier device system is being used to track a vehicle. Those skilled in the art will further appreciate that the tracking capabilities of the plurality of law enforcement fleet multiplier devices 10 in the law enforcement fleet multiplier system may also be used to track an individual, or any other type of tracking that is desired for use by law enforcement.

Figure 8:
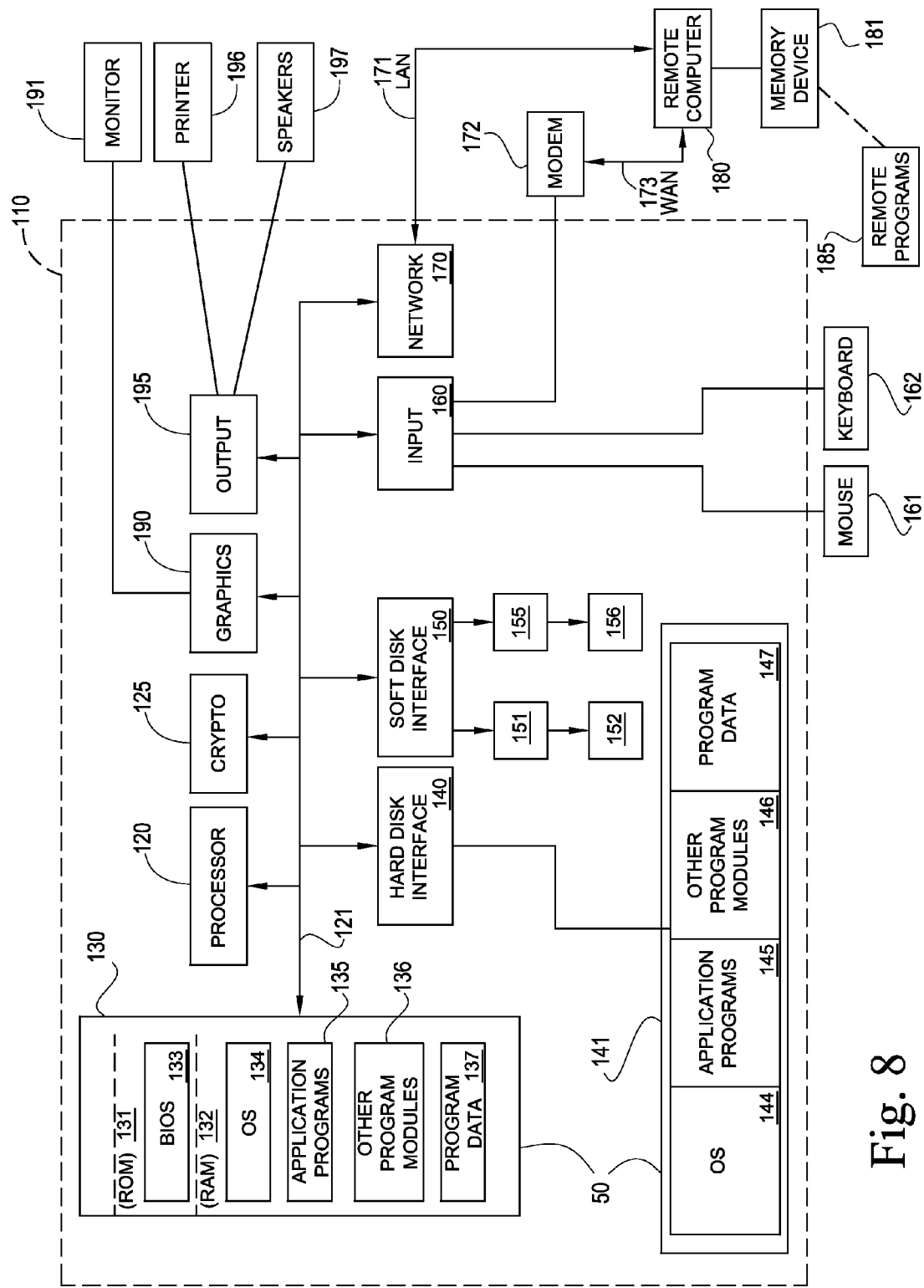
FIG. 8 is a block diagram of a typical computer system used to run the computer program according to an embodiment of the present invention.

FIG. 8 illustrates a computing device in the form of a computer 110, which is capable of performing one or more computer-implemented steps in practicing the method aspects of the present invention. Components of the computer 110 may include, but are not limited to, the processor 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computer 110 typically includes a variety of computer readable media. Computer readable media can be any available media that can be accessed by a computer 110 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

RELATED APPLICATIONS

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 8 illustrates an operating system (OS) 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives, and their associated computer storage media discussed above and illustrated in FIG. 8, provide storage of computer readable instructions, data structures, program modules and other data for the computer 110. In FIG. 8, for example, hard disk drive 141 is illustrated as storing an OS 144, application programs 145, other program modules 146, and program data 147. Note that these components can either be the same as or different from OS 134, application programs 135, other program modules 136, and program data 137. The OS 144, application programs 145, other program modules 146, and program data 147 are given different numbers here to illustrate that, at a minimum, they may be different copies. A user may enter commands and information into the computer 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor 191, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181.

The communications connections 170 and 172 allow the device to communicate with other devices. The communications connections 170 and 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

According to an embodiment of the present invention, a computer program product 50 is disclosed, which may be capable of creating a computerized interface for use in data acquisition, establishing a database management system, and building an application based on the user data entered. A computer program product 50, according to an embodiment of the present invention, will be described in further detail as a project that is creatable using, for example, but not intended as a limitation, Microsoft's Visual C#.NET development environment. Such a computer program product 50 would be suitable for execution on a computer 110 having, for example, but not intended as a limitation, one of Microsoft's Windows family or Apple's Mac OSX family of operating systems loaded into memory 134. A person having ordinary skill in the art, after having the benefit of this disclosure would recognize that many other development platforms might be used to create a computer program product 50, which may be executable with many other operating systems, but that still embody the present invention. As such, this disclosure is provided merely for explanatory purposes and should in no way limit the present invention to computer program products 50 that are created using the aforementioned development platform or for use with the aforementioned operating systems.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

That which is claimed:

1. A law enforcement fleet multiplier device including a law enforcement vehicle silhouette comprising:
    a plurality of sections connected to one another, each of the plurality of sections having an obverse surface and a reverse surface;
    connectors to connect each of the plurality of sections to a surface;
    a control module carried by one of the plurality of sections;
    a light array carried by an upper portion of at least one of the plurality of sections and in communication with the control module;
    a power supply carried by one of the plurality of sections and in communication with the control module; and
    a camera carried by one of the plurality of sections and in communication with the control module;
    a speed detection device carried by one of the plurality of sections and in communication with the control module;
    wherein at least one of the light array or the camera and the speed detection device remotely operable;
    wherein the light array is operable responsive to detection of a parameter by at least one of the camera or the speed detection device; and
    wherein at least one of the light array or the camera and the speed detection device are operable responsive to user defined conditions.

2. The device according to claim 1 wherein the obverse surface carries a substrate having markings of a law enforcement vehicle positioned thereon.

3. The device according to claim 2 wherein the reverse surface carries a substrate having markings of a law enforcement vehicle positioned thereon.

4. The device according to claim 1 wherein the parameter is at least one of an observed speed, an observed vehicle operation, an observed visibility condition, an observed vehicle accident, an observed maintenance condition, or an observed hazard condition.

5. The device according to claim 1 wherein the parameter is at least one of a reported vehicle speed, a reported vehicle operation, a reported visibility condition, a reported vehicle accident, a reported maintenance condition, or a reported hazard condition.

6. The device according to claim 1 wherein the power supply is provided by a battery.

7. The device according to claim 6 wherein the battery is connected to a solar powered trickle charger.

8. The device according to claim 1 wherein the camera includes a tamper sensor; wherein the camera is operable responsive to the tamper sensor; and wherein images captured by the camera are transmitted to a remote location.

9. The device according to claim 1 wherein the plurality of sections comprise a front section, a middle section and a rear section that are connectable to one another using one of a hinged connection, a latch and catch connector, or a hook and eye connector.

10. The device according to claim 1 wherein the camera captures at least one image of at least a portion of a vehicle responsive to a speed detected by the speed detection device in excess of a parameter, the at least one image being defined as a captured image; and wherein the camera transmits the capture image to a remote location for issuance of a citation.

11. A law enforcement fleet multiplier device including a law enforcement vehicle silhouette comprising:
    a plurality of sections connected to one another, each of the plurality of sections having an obverse surface and a reverse surface, both the obverse surface and the reverse surface having markings of law enforcement vehicles positioned thereon;
    connectors to connect each of the plurality of sections to a surface;
    a control module carried by one of the plurality of sections;
    a light array carried by an upper portion of at least one of the plurality of sections and in communication with the control module;
    a power supply carried by one of the plurality of sections and in communication with the control module;
    a camera carried by one of the plurality of sections and in communication with the control module; and
    a speed detection device carried by one of the plurality of sections and in communication with the control module;
    wherein at least one of the light array and the sensor are remotely operable;
    wherein the camera captures at least one image of at least a portion of a vehicle responsive to a speed detected by the speed detection device in excess of a parameter, the at least one image being defined as a captured image;
    wherein the camera transmits the captured image to a remote location for issuance of a citation;
    wherein the light array is operable responsive to detection of a sensed condition by at least one of the camera and the speed detection device; and
    wherein at least one of the light array and the sensor are operable responsive to user defined conditions.

12. The device according to claim 11 wherein the parameter is at least one of an observed speed, an observed vehicle operation, an observed visibility condition, an observed vehicle accident, an observed maintenance condition, or an observed hazard condition.

13. The device according to claim 11 wherein the power supply is provided by a battery connected to a solar powered trickle charger.

14. The device according to claim 11 further comprising a tamper sensor; wherein the camera is operable responsive to the tamper sensor; and wherein images captured by the camera are transmitted to a remote location.

15. The device according to claim 11 wherein the plurality of sections comprise a front section, a middle section and a rear section that are connectable to one another using one of a hinged connection, a latch and catch connector, or a hook and eye connector.

16. A law enforcement fleet multiplier system comprising:
- a plurality of law enforcement fleet multiplier devices, each device including a law enforcement vehicle silhouette comprising:
- a plurality of sections connected to one another, each of the plurality of sections having an obverse surface and a reverse surface, both the obverse surface and the reverse surface having markings of law enforcement vehicles positioned thereon;
- connectors to connect each of the plurality of sections to a surface;
- a control module carried by one of the plurality of sections;
- a light array carried by an upper portion of at least one of the plurality of sections and in communication with the control module;
- a power supply carried by one of the plurality of sections and in communication with the control module;
- a camera carried by one of the plurality of sections and in communication with the control module;
- a speed detection device carried by one of the plurality of sections and in communication with the control module;
- wherein at least one of the light array and the sensor are remotely operable;
- wherein the light array is operable responsive to detection of a sensed condition by at least one of the camera and the speed detection device;
- wherein at least one of the light array and the sensor are operable responsive to user defined conditions;
- wherein the parameter is at least one of an observed speed, an observed vehicle operation, an observed visibility condition, an observed vehicle accident, an observed maintenance condition, or an observed hazard condition;
- wherein each of the law enforcement fleet multiplier devices further comprises a tamper sensor; wherein the camera is operable responsive to the tamper sensor; and wherein images captured by the camera are transmitted to a remote location; and
- wherein each of the plurality of law enforcement fleet multiplier devices are communicatively connected to one another and to a central location.

* * * * *